US011230292B2

(12) United States Patent
Augst

(10) Patent No.: US 11,230,292 B2
(45) Date of Patent: Jan. 25, 2022

(54) METHOD, APPARATUS, COMPUTER PROGRAM AND COMPUTER PROGRAM PRODUCT FOR PROCESSING DATA OF A ROUTE PROFILE FOR A VEHICLE

(71) Applicant: Bayerische Motoren Werke Aktiengesellschaft, Munich (DE)

(72) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 528 days.

(21) Appl. No.: 15/851,284

(22) Filed: Dec. 21, 2017

(65) Prior Publication Data
US 2018/0111623 A1  Apr. 26, 2018

Related U.S. Application Data

(63) Continuation of application No. PCT/EP2016/063301, filed on Jun. 10, 2016.

(30) Foreign Application Priority Data

Jun. 26, 2015  (DE) ...................... 10 2015 211 892.4

(51) Int. Cl.
*B60W 40/06* (2012.01)
*G01C 21/30* (2006.01)
(Continued)

(52) U.S. Cl.
CPC ............. *B60W 40/06* (2013.01); *G01C 21/30* (2013.01); *G01C 21/3415* (2013.01);
(Continued)

(58) Field of Classification Search
None
See application file for complete search history.

(56) References Cited

U.S. PATENT DOCUMENTS

2012/0203428 A1\* 8/2012 Choi ...................... B60G 17/08
701/37
2014/0122014 A1\* 5/2014 Flik .................... G06K 9/00791
702/141
(Continued)

FOREIGN PATENT DOCUMENTS

DE   10 2004 048 638 A1   4/2006
DE   10 2007 042 877 A1   3/2009
(Continued)

OTHER PUBLICATIONS

PCT/EP2016/063301, International Search Report dated Aug. 2, 2016 (Three (3) pages).
(Continued)

*Primary Examiner* — Jonathan M Dager
*Assistant Examiner* — Garrett F Evans
(74) *Attorney, Agent, or Firm* — Crowell & Moring LLP

(57) ABSTRACT

Route profile data for a vehicle is processed by acquiring a first set of the route profile data for a predetermined route section of a route of the vehicle depending on data provided by a sensor of the vehicle or another vehicle, where the first set of the route profile data is representative of at least a first local physical road characteristic of the predetermined route section. A second set of the route profile data, which is at least partly related to the predetermined route section, is read, where the second set of the route profile data is representative of at least a second local physical road characteristic. A degree of similarity between the first set of the route profile data and the second set of the route profile data is determined. The second set of the route profile data is assigned, based on the determined degree of similarity, to at least one of conditions immediately surrounding the vehicle and a time-dependent mapping function of influences that the route has on the vehicle.

20 Claims, 3 Drawing Sheets

(51) Int. Cl.
*G01C 21/34* (2006.01)
*B60W 50/00* (2006.01)

(52) U.S. Cl.
CPC . *G01C 21/3484* (2013.01); *B60W 2050/0075* (2013.01); *B60W 2050/0088* (2013.01); *B60W 2556/10* (2020.02); *B60W 2556/45* (2020.02)

(56) References Cited

U.S. PATENT DOCUMENTS

| | | | |
|---|---|---|---|
| 2014/0195112 A1* | 7/2014 | Lu | B60G 17/0165 701/37 |
| 2015/0160021 A1* | 6/2015 | Knox | G01C 21/26 701/468 |
| 2015/0166072 A1* | 6/2015 | Powers | G08G 1/0129 701/1 |

FOREIGN PATENT DOCUMENTS

| | | |
|---|---|---|
| DE | 11 2009 005 342 T5 | 12/2012 |
| DE | 10 2012 009 674 A1 | 9/2013 |
| WO | WO 2011/054363 A1 | 5/2011 |

OTHER PUBLICATIONS

German Search Report issued in German counterpart application No. 10 2015 211 892.4 dated May 17, 2016, with Statement of Relevancy (Six (6) pages).

Holzapfel et al., "Road Profile Recognition for Autonomous Car Navigation and Navstar GPS Support" IEEE Transactions on Aerospace and Electronic Systems, IEEE Service Center, Piscataway, NJ, US, vol. 39, No. 1, Jan. 31, 2003. pp. 2-12, XP001158255.

Kertesz et al., "Measurement of Road Roughness by Low-Cost Photogrammetric System", May 29, 2007, 5 total pages, XP05521423, URL:http://www.isprs.org/proceedings/XXXV1/5-C55/papers/kertesz_lmre.pdf.

* cited by examiner

METHOD, APPARATUS, COMPUTER PROGRAM AND COMPUTER PROGRAM PRODUCT FOR PROCESSING DATA OF A ROUTE PROFILE FOR A VEHICLE

CROSS REFERENCE TO RELATED APPLICATIONS

This application is a continuation of PCT International Application No. PCT/EP2016/063301, filed Jun. 10, 2016, which claims priority under 35 U.S.C. § 119 from German Patent Application No. 10 2015 211 892.4, filed Jun. 26, 2015, the entire disclosures of which are herein expressly incorporated by reference.

BACKGROUND AND SUMMARY OF THE INVENTION

The invention concerns a method for processing data of a route profile for a vehicle and a corresponding apparatus. The invention furthermore concerns a computer program and a computer program product.

Various technical solutions are known from the field of automotive engineering that serve to move a vehicle and at least one vehicle passenger compartment in a relatively comfortable and stable manner despite very varying and, in part, very poor roadway quality. These technical solutions are based on a highly complex actuator system and control technology, which is used, for example, to compensate for vertical dynamic and other factors of a route to the furthest extent possible. Most of the time, this requires a significant increase in vehicle weight and a high level of energy consumption.

In addition, navigation systems for vehicles are known that include information about roads with a more or less good road surface. For example, bad roads or certain obstacles, such as construction areas are identified as such in a map, whereby, in addition, a driver of the vehicle can be automatically warned. Thereby, the driver can avoid such roads. Such information has an abstract character, which means it does not describe, for example, a specific geometric profile of a road bump or ruts.

For a plurality of reasons, the vehicles of today also do not have their own positioning system that would make an adequately sufficient collection of local information of a spatial nature possible or make the later use of said information possible.

The object the invention is based on is to create a method and corresponding apparatus that help to efficiently provide or enable the use of route profile data for a vehicle that represents the local physical characteristics of a route profile.

The invention is characterized by a method and a corresponding apparatus for processing route profile data for a vehicle. The first set of route profile data for a predetermined route section is acquired depending on data that have been collected by means of a given sensor apparatus of a vehicle or another vehicle, whereby the first set of route profile data is representative of at least a first local physical road characteristic of the predetermined route section. In addition, the second set of route profile data provided is read, which is, at least in part, related to the predetermined route section, whereby the second set of route profile data is representative of at least a second local physical road characteristic. A degree of similarity between the first set of route profile data and the second set of route profile data is determined and, depending on the degree of similarity, the second set of route profile data is assigned to the conditions immediately surrounding the vehicle and/or to a time-dependent mapping function of the influences of the route on the vehicle.

Thereby being an advantage, using the first set of route profile data that is collected by means of a sensor system, a precise assignment of the second set of route profile data related to the immediate surroundings of the vehicle can be determined. It is particularly beneficial that the first set of route profile data can be acquired very easily. In particular, this means having a lower level of accuracy than the second set of route profile data. The second set of route profile data is preferably acquired in a very detailed, very accurate and elaborate manner so a volume of data of the second set of route profile data for the given route section is considerably greater than is the case with first set of route profile data. The detailed second set of route profile data that preferably comprises a very precise spatial reference can be provided for other applications in the vehicle. The first and/or second set of route profile data can be suitably used in the vehicle, preferably for chassis systems, more particularly for vertical dynamic systems of the vehicle, other regulation and control systems, information systems or driver assistance systems.

Thereby, within the scope of the method, the first set of route profile data can be determined from the data acquired and provided by a sensor apparatus that is installed in the vehicle or the portable sensor apparatus located in the vehicle. For example, the sensor apparatus can be a stereo camera available in the vehicle or a sensor apparatus belonging to a portable part of an apparatus that is attached within the vehicle and is, in particular, set up for executing the method. The determination can more particularly entail a specific and/or selective reading of the data from a sensor apparatus.

The second set of route profile data provided, which refers, at least in part, to the predetermined route section, can be read depending on a sequence of global and/or relative positions of the vehicle (specifically chosen). Thereby, one or a plurality of data segments can be determined and read very efficiently from a volume of data, which may possibly be very large.

Preferably, the assignment is determined in such a way that it represents a spatial reference of the second local physical characteristics from the second route profile with relation to the immediate surroundings of the vehicle, in particular, with relation to the predetermined route section. As an alternative or additionally, a classification may also represent a time-related reference.

The classification may also represent a scientific connection between the data of the second route profile and, more particularly, quantitative measurements of one or a plurality of effects (to be expected) of local physical characteristics on the vehicle, for example a vehicle running at a given speed.

It is especially preferred that the determined assignment represents a distribution of local physical characteristics relative to the vehicle, more particularly within a coordinate system connected to the vehicle. Thereby, the spatial assignment may preferably take place in at least a two-dimensional manner.

It is especially preferred that the assignment is determined using one mapping function or a two-dimensional mapping function that represents an assignment of the second set of route profile data concerning a current position and/or the current immediate surroundings of the vehicle in at least two spatial directions (for example, width and length as well as longitudinally and transversely in the vehicle coordinate system).

Thereby, a spatial assignment and mapping function may represent a variety of assignment points and/or one or a plurality of scaling metrics. Preferably, the spatial assignment entails spatial mapping information or transformation information or transformation instructions, using which a spatial assignment of a local physical characteristic represented within the second set of route profile data can take place for certain parts of the route.

The assignment can also be analogously determined as a time-related mapping function.

Alternatively or in addition to the assignment, a time-dependent mapping function of the effects of the route on the vehicle can also be determined. For example, this can represent a sequence or a time function that represents a time-related mapping of certain effects (to be expected in the near future) of the local physical road characteristics on the vehicle.

Such a time-dependent mapping function may be determined depending on the current odometric data and/or odometric data determined in advance to occur in the near future of the vehicle, in particular, deriving from the motion data of the vehicle's wheels. Thereby, the one time-dependent mapping function can also refer to individual parts of the vehicle, for example, one or a plurality of certain wheels.

The assignment can also represent a (two-dimensional) spatial and/or time-related offset between the first set of route profile data and the second set of route profile data.

The determined assignment can be made available, particularly as mapping information and/or as a second set of route profile data that has already been assigned to the immediate surroundings of the vehicle and/or as a time-dependent mapping function of the effects of the route on the vehicle.

This can directly or indirectly, particularly in real-time, be used to vary at least one regulation and control system, in particular a vertical dynamic system of the vehicle or in a driver assistance system of the vehicle. Thereby, even for a vehicle, a very precise distribution of the local physical characteristics in its surroundings can be determined, even without an exact determination of the vehicle's position and also without a sufficiently precise position reference of the provided second set of route profile data. The assignment determined in this way can also considerably make the use of the first and/or the second set of route profile data easier in various functions of the vehicle.

In comparison to a conceivable assignment of the second set of route profile data, a considerable advantage arises, for example with regard to navigation data in a vehicle. The navigation data that can be determined using typical means of a vehicle generally do not include suitable height and tilt resolution that are required for an assignment of a three-dimensional road profile to the surroundings of the vehicle, for example. Navigation data of freely available positioning systems also primarily have an insufficient level of resolution and may show very varying quality levels depending on the position or the surroundings.

Thereby, the assignment may, at least as an additional piece of information, also help to eliminate these disadvantages. With particular effectiveness, the method can also be used with route profile data with a high degree of detail.

In addition, by means of the method, a test and/or plausibility check and/or correction of the first and/or second set of route profile data or their assignment to the vehicle's surroundings can be carried out, especially when rendered more precisely.

The first and second set of route profile data are more particularly representative of a course of a physical road characteristic with reference to a factor that represents positioning information and/or time information. Here, the course of absolute factors and/or relative factors of the local physical road characteristic can be acquired or ascertained. A physical road characteristic profile can by one or a plurality of functions, scientific relationships, tables, a variety of individual values, for example, with reference to regular distances or time intervals.

In the case of positioning information and/or time information, it can be an absolute and/or relative positioning information or time information. For example, positioning information may refer to a distance or a position between a certain point on the route and a certain part of the vehicle. A relative piece of time information can be expressed in units of time in relation to a current point in time, for example.

In the case of a route section, preferably, it can be sections of roads or lanes. Additionally or as an alternative, the route section may be ground or terrain that is formed and expanded in any way with or without artificially created features, for example, of an infrastructure.

Preferably, the local physical road characteristics include at least one local distribution of given geometric factors within the route section. Preferably, these may include at least a local distribution of certain measurement values with relation to a road surface, preferably a height profile, more particularly a course of the height profile. In particular, the distribution of local physical characteristics refers to a spatial resolution of about 1 to 10 meters, preferably referring to 0.1 m to 1 m; especially preferably, referring to 0.01 meters to 0.5 meters.

Furthermore, the processing of other permanent or variable (more specifically, time-dependent) measured parameters that identify a certain route section, in particular, at a certain time interval, is possible and favorable.

The local physical road characteristics may preferably refer to a route section or to a part of a route profile or a route with a horizontal expansion of 0 to 100 m for example; thereby referring to approximately 10 m being especially preferred. The related data can also therefore form easily manageable data packages.

Thereby, the degree of similarity can be determined for a correlation or cross-correlation of related spatial and/or time-related courses of the second set of route profile data and the first set of route profile data depending on a single measurement. The degree of similarity may also be determined or estimated depending on a shape, phase parameters, in particular phases with measured parameters ascending or descending in value, using certain distinct points within a series of values of the physical road characteristics.

In addition or as an alternative, the degree of similarity may be determined by one or a plurality of pattern recognitions.

Thereby being an advantage, the determination of the degree of similarity may be used on a profile that is represented as a variety of quantitative values, for example. Thereby, the advantage arises that, despite the data deficits or (measurement) tolerances, acquisition gaps in the first set of route profile data or in the second set of route profile data that exist in practice, an appropriate data segment can be found and/or precise decoding information can be determined.

In order to determine the degree or a plurality of degrees of similarity, the amplitudes, frequency responses or other parameters of the profiles of physical road characteristics can be changed, more particularly, being standardized or filtered into appropriate value ranges. The first and/or second set of route profile data, which may at least be available in part as a result of discrete values, may also be interpolated to determine the degree of similarity.

The degree of similarity may also refer to the respective spectral distributions of the profiles of the respective local physical road characteristics represented in the first set of route profile data and the second set of route profile data.

Determining the degree or a plurality of degrees of similarity can also be derived from known or probable causal relationships between the physical road characteristics or the underlying measured parameters. Thereby, the degree or degrees of similarity may also be determined by means known per se within the scope of chaos theory.

A data segment can be representative of a part of the route profile data, for example, a geometrical area of the route section and include 10 cm to 10 m, for example.

In the case of the given route section, it preferably has to do with a section of a road driven on by the vehicle that is located at a predetermined distance in front of the vehicle or is driven on by the vehicle over a predetermined period of time with a probability exceeding a predetermined extent. The route sections may include sections of the route that are the same or different in size. These can have fixed defined, variable or curvilinear boundaries.

In a favorable embodiment, positioning information is determined that is representative of a given route section and the second set of route profile data is provided depending on the determined positioning information. More particularly, the second set of route profile data is provided depending on a position of the predetermined route section. A relevant route section can preferably be a route section that is to be driven on in the near future. More particularly, this may include the current vehicle position (but it does not have to).

In another favorable embodiment, the first local physical road characteristics and the second local physical road characteristics refer, at least in part, to different physical road characteristics or measured parameters.

In another favorable embodiment, the first local physical road characteristics are assigned, at least in part, to one first class and the second local physical road characteristics are assigned, at least in part, to one second class, whereby the first class and the second class are different in such a way that one of the classes includes local physical road characteristics that can be assigned directly to the road and the other class includes local physical road characteristics that are determined depending on a specific characteristic of the vehicle and/or another vehicle. This has the advantage that the assignment of the second set of route profile data of one or a plurality of second classes to the immediate surroundings of the vehicle can take place using the first (primitive) route profile data of the first class.

In a further favorable embodiment, the at least one first local physical road characteristic and/or the at least one second local physical road characteristic represents a profile of a local road height and/or road curvature and/or a profile of transverse forces that have an effect on the vehicle or another vehicle when driving on the route section and/or a profile of a friction coefficient and/or a profile of a local temperature of the road and/or a profile of at least one mechanical force that has an impact on a component of a chassis of the vehicle.

Thereby, different forces (vertical forces, longitudinal forces, transverse forces) and corresponding spatial and/or temporal profile functions that each act on at least a specific wheel of the vehicle can be taken into consideration separately or together. The first set of route profile data can also refer to a certain type of forces, for example to such forces as can be detected with sensors with less effort, and the second set of route profile data can refer to another type of forces.

In another favorable embodiment, the first set of route profile data and the second set of route profile data refer, at least in part, to different running directions within a route section. Hereby, the first set of route profile data may refer to a longitudinal direction and the second set of route profile data may refer to a transverse direction.

Thereby, a longitudinal direction can be defined as a direction along a course of a route or a traveling direction of the vehicle or primarily as a direction along a course of a route or a traveling direction of the vehicle. Thereby, a transverse direction can be defined as a direction transverse to the course of a route or the traveling direction of the vehicle or primarily as a direction transverse to the course of a route or the traveling direction of the vehicle.

Thereby, from the first set of route profile data that is preferably relatively primitive and detected using means of the vehicle, thereby referring to a longitudinal direction, the assignment for the detailed and elaborate coded second set of route profile data available, thereby referring to the same or a different running direction, for example, transverse to the traveling direction of the vehicle, can be determined.

In another favorable embodiment, the first set of route profile data and/or the second set of route profile data are determined depending on a course of route relief detected using means of the vehicle or another vehicle, more particularly one or a plurality of route inclinations and/or one or a plurality of route curvatures within the route section.

Thereby, the route relief is preferably understood as a variable portion of a vehicle height within a route section. Thereby, it has to do with height differences of preferably less than +/−5 cm or +/−10 cm. Thereby, the height differences which are, for example, represented by a location dependent course, can have a distance of less than +/−10 cm or +/−50 cm to each other. This is particularly favorable, since such height differences in the case in which the data with predictive chassis functions is subsequently used can be taken into consideration or compensated for, for more accurate or more efficient control. Thereby, such a control system can detect an adjustment of the vehicle actuators to the specific local physical characteristics at their respective position. Predictive control of the actuators can also take place, that take the local physical characteristics within a route section to be driven on in the near future into consideration (for example in the next 0.1 to 10 seconds). Thereby, the dead time of the actuator system, settling time of mechanical, electronic or hydraulic vehicle systems can also be taken into consideration in a beneficial manner.

Preferably, the route relief is represented as a location-related function of the, for example, relative, local road height or route curvature, more particularly with relation to a reference value that represents an average height of a route section or an average route curvature. This can also refer to a parameter which represents positioning information, preferably a longitudinal and/or transverse direction of a road or to a sensor position relative to a measured point.

The term route curvature refers to the height curvature, more particularly, to the curvature centers above or beneath the route. Thereby, the route curvature can be described as one or a plurality of considerably pronounced curvatures of the route, for example, as a function of the course of the curvature in the longitudinal and/or transverse direction of a route. Thereby, it has to do with curvatures with radii of preferably 0.1 to 5 meters. This is particularly favorable, since such route curvatures at the time the data with predictive stabilizing functions is subsequently used for more accurate or more efficient control can be taken into consideration or compensated for.

Preferably, the course of the route relief is acquired as a, more particularly, time-discrete function. The profile of the route relief can include measurement data that are representative of the route height profile and/or route inclination profile and, more particularly, are absolute or relative, for example, angle differences from a sensor perspective.

More particularly, the profile of the route relief can be determined by using different measurement methods. Thereby, the profile of the route relief can be determined, in particular, from a combination of the data of a camera and/or stereo camera, measurement of a mechanical parameter at one to four wheels of the vehicle and/or of an inertial sensor system of the vehicle.

In another favorable embodiment, the first set of route profile data refers to the first local physical road characteristics of a first route section and the assignment of the second set of route profile data is determined for a second route section, whereby the first route section and the second route section are different. Preferably, the first route section refers, fully or in part, to a part of the road under the vehicle or another part of the road in the immediate proximity to the part of the road under the vehicle. For example, the first route section refers to an area of 6 m to 7 m in front of or behind the vehicle or 3 m to 4 m on the side of the vehicle. Preferably, the second part of the route refers to a range of the road to be driven on by the vehicle in the near future that is 5 m to 25 m or 10 m to 200 m in front of the vehicle along the traveling direction of the vehicle. Hereby, depending on the first set of route profile data and the second set of route profile data, the second route section is assigned. The first set of route profile data can be determined using a sensor that is aligned toward the underneath or the back of the vehicle. The first set of route profile data determined in the vehicle can therefore refer to the "past". Thereby, the decoding of the coded second set of route profile data takes place, for example, for the route sections situated in front of the vehicle that are still to be driven on, meaning the second set of route profile data can refer to the "future".

In a further favorable embodiment, the first set of route profile data is determined by determining a profile of the vertical and/or transverse forces having an impact on the vehicle. Preferably, the profile of the vertical and/or transverse forces having an impact on the vehicle is determined depending on a course of a mechanical parameter within the vehicle. In the case of the profile of the vertical and/or transverse forces having an impact on the vehicle, these can be the impact of forces on parts of the vehicle. These can be recorded using the chassis's sensors. More particularly, the profile of the vertical and/or transverse forces having an impact on the vehicle also concerns vibrations, more particularly of a certain type and/or with a certain amplitude and/or a certain amplitude curve. The mechanical parameters include, for example, movements and shifts of vehicle parts toward each other that can be detected by a sensor system. The vertical and/or transverse forces having an impact on the vehicle do not only reflect, for example, a profile of the route, but also which transverse forces have an impact on the vehicle at the point concerned. These vertical and/or transverse forces are therefore, for example, also useful for other purposes, such as, for example, for the determination of the service life of parts or a respective, more particularly, remaining part service life of vehicle parts determined and/or integrated over the long-term. Such a remaining part service life of a plurality of different vehicle parts can, for example, be read and/or be represented in numbers, symbols or graphically using a display apparatus or a diagnosis unit. By means of this, a considerably more efficient use of the vehicle parts concerned and an improvement of safety is possible. These vertical and/or transverse forces can be alternatively or additionally also be used for an adaptive setting of control parameters for driver assistance systems.

In another favorable embodiment, the second set of route profile data from a second vehicle is provided, which is located in a predetermined environment of the vehicle and/or drives in a predetermined direction toward the vehicle. Hereby, the second set of route profile data can be made directly available, meaning, for example, transferred via a direct communication connection to the vehicle. Additionally or as an alternative, it is possible that the vehicle sends the vehicle data to a so-called backend system and the second set of route profile data is sent from the backend system to the vehicle. Preferably, the second set of route profile data was acquired from the second vehicle when it drove over the same route as the vehicle in the past.

The second set of route profile data can be acquired and/or determined by the second vehicle. The second set of route profile data provided by the second vehicle can currently represent a determined second set of route profile data or historical data, meaning the second set of route profile data that was determined in the past when the second vehicle drove, at least in part, on the same route as the vehicle.

Preferably, in the case of the second vehicle, it has to do with a vehicle traveling in advance in the traveling direction with reference to the vehicle that receives the second set of route profile data.

Also, in the case of the second vehicle, it can have to do with a vehicle coming in the opposite direction. Preferably, in this way, it is possible that the vehicle can utilize very precise and/or a current second set of route profile data that are not able to be acquired and/or determined by it on its own.

In another favorable embodiment, a vehicle profile of the vehicle is made available and, depending on the vehicle profile and the second set of route profile data, information is determined that is representative of at least one degree of an impact of the local physical road characteristics on the vehicle when driving on a given local route section. Preferably, this will make it possible to determine the effects of the route on the vehicle. Thereby, the second set of route profile data, which is representative, preferably independently of the vehicle, can be adapted to the vehicle, meaning a vehicle-independent assignment and/or decoding information is determined and made available.

The vehicle profile includes, for example, responsivity to various spectral frequency components and/or areas of the local physical characteristic. Preferably, the responsivity can include a vibration transmission function from the route to the passenger compartment. More particularly, the vibration transmission function can also be dependent upon speed.

In another favorable embodiment, the first set of route profile data and/or the second set of route profile data respectively represent a varying local physical road characteristic of a route section. Thereby, a varying road characteristic can represent, for example, a road characteristic that changes within less than a few hours or days, such as a course of the temperature measurements of the road within a route section. A permanent local road characteristic can be a road characteristic that does not considerably change for days or months.

For example, the first set of route profile data may refer to permanent physical route characteristics (for example a height profile). In the case of the second set of route profile data, it may have to do with a friction coefficient profile, that varies, for example dependent upon location (over a relatively short period of time, for example, depending on the weather). The data provided within the vehicle concerning the friction coefficient profile can be read by a driver assistance function and then, for example, a longitudinal dynamic and/or transverse dynamic maneuver can be varied to increase safety or comfort.

A varying local road characteristic can also be understood as a changing portion of a local road characteristic.

In another favorable embodiment, the first set of route profile data and/or the second set of route profile data respectively represent a distribution function or profile function of the route moisture and/or a distribution function or profile function of the route temperature and/or a distribution function or a profile function of the friction coefficient. The first set of route profile data and/or the second set of route profile data may therefore respectively represent a static and/or varying portion of local physical road characteristics of a route section. It is especially favorable that the changing portions of local physical route characteristics can be used if, for example, the second set of route profile data can be provided by a preceding vehicle and the second set of route profile data can therefore be provided in a very up-to-date manner.

In a further favorable embodiment, the second set of route profile data is provided in the coded manner, whereby the coded route profile data include a spectral distribution and/or spectral distribution function determined depending on the second set of route profile data.

Thereby, the spectral distribution and the spectral distribution function can be provided using the assigned positioning information, whereby the positioning information is representative of a global position of a route section. In a first step, the data segments of the second set of route profile data, which are at least roughly assigned to the given route section, can be called up or made available. In doing so, an (exact) assignment to the immediate surroundings of the vehicle takes place depending on the first set of route profile data determined via means belonging to the vehicle.

The coding of the second set of route profile data using a spectral distribution and/or spectral distribution function makes it possible for inherently extremely extensive data, for example, a distribution of parameters, such as height differences along a route section can be made available in a very compact form.

The spectral distribution and/or the spectral distribution function of the second set of route profile data can be efficiently transmitted to the vehicle, for example, by a server and/or another vehicle, for example, in the form of continuous data-stream transmission. More particularly, the transmission entails wireless transmission in the form of a plurality of data packages. Thereby, a breakdown of data into data packages can take place, preferably depending on the relation between the data and certain route profiles.

The spectral distribution is more particularly determined using a time-discrete Fourier analysis, in particular, using Fourier transformation. Here, in summary, Fourier transformation refers to a method of Fourier analysis that makes it possible to break down continuous aperiodic signals into a continuous spectrum. The function that describes this spectrum is also known as a Fourier transformed or spectral function. Essentially, the determination of the spectral distribution includes the formation of a spectral function, preferably using discrete forms of Fourier analysis, for example, using a quick Fourier transformation (FFT), a cosine transformation and/or a modified discrete cosine transformation (MDCT), more particularly resolved according to a single location.

In the case of the second set of route profile data and/or in the case of the second local physical road characteristics, it can have to do with a data fusion or data aggregation deriving from data captured from a plurality of vehicles (by means of a sensor system) in the past. Such an aggregation of data can achieve a high level of reliability and accuracy, as well as a very high percentage of road coverage within a road network.

The degree of similarity can, as an alternative or in addition, be determined between the related spectral values by means of a comparison of spectral distribution functions, for example, a distribution of various frequencies, for example, with reference to a vibration or having a spatial or time-related reference. Hereby, one or a plurality of spectral distributions or a spectral distribution function can be determined from the first set of route profile data and a degree of similarity can be determined using the coded second set of route profile data.

Thereby, the coded second set of route profile data can be provided, read by or streamed, in a targeted manner, from a data carrier on which the data are stored over the long-term within or outside of the vehicle, for example in a backend system, Internet portal or a so-called cloud.

Thereby being an advantage, using the first set of route profile data that are collected by means of a sensor system, the provided coded second set of route profile data can be decoded in accordance with the immediate surroundings of the vehicle. It is particularly advantageous that the first set of profile data can also be acquired very easily, meaning in particular, having a lower level of accuracy than the second set of route profile data. The second set of route profile data is preferably acquired in very detailed, very accurate and elaborate manner so a volume of data of the non-coded second set of route profile data for the given route section is considerably higher than is the case within the first set of route profile data. The first and/or second set of route profile data can be suitably used in the vehicle, preferably for chassis systems, more particularly vertical dynamic systems of the vehicle, other regulation and control systems, information systems or driver assistance systems. Thereby, the provided second set of route profile data can be used with or without the first set of route profile data in real-time.

In another favorable embodiment, depending on the first set of route profile data, decoding information is determined for the coded second set of route profile data and, depending on the decoding information, the coded second set of route profile data is, at least in part, decoded and made available.

The decoding information for the coded second set of route profile data may refer to the decoding and/or use of given data segments of the coded second set of route profile data. Thereby, the decoding of the coded second set of route profile data, which is provided by a data carrier in the vehicle or by a backend system as streaming, may take place in the vehicle in accordance with a route section that is currently being driven on or will soon be driven on, more particularly, in accordance with the current requirement of predictive regulation systems of the vehicle (for example, with reference to certain spatial areas or a certain prediction time horizon). Thereby, certain data segments can also be targeted and called up in an optimized sequence.

In addition or as an alternative, the decoding information can be determined in the vehicle and transmitted to another vehicle so that the other vehicle can decode the coded second set of route profile data with the received decoding information.

In another favorable embodiment, the coded second set of route profile data is decoded by means of Fourier retransformation. The decoding information for the coded second set of route profile data can include information via executing a synthesis by means of a reverse Fourier function.

Being especially preferred, the decoding information includes one or a plurality of the following information listed:
- A first set of information that is representative of an absolute reference value or a profile of a reference value, which the at least one local physical characteristic or the coding refers to.
- A second set of information that is representative of an assignment of the second set of route profile data to predefined patterns.

The information concerns data that is used when decoding coded functions by means of Fourier analysis respectively.

The predefined patterns include, for example, given gap functions, angle profiles and/or given standard potholes. The second set of information has the advantage that it can be simply determined from a phase shift according to location and/or time between the first set of route profile data and the second set of route profile data. Furthermore, an appropriate data segment or appropriate data segments of the coded second set of route profile data can be read and an appropriate data segment can be decoded that matches the given route section.

In another favorable embodiment, at least one of the following steps is carried out depending on the determined assignment of the second set of route profile data:
- active control of vertical dynamic attenuation and/or acceleration effect on a passenger compartment of the vehicle and/or
- change of a function that controls a torque having impact on the steering wheel of the vehicle depending on the force effect of the local physical characteristic of a route on at least one wheel of the vehicle and/or
- change of at least one vehicle function for the semi-automated longitudinal and/or transverse control of the vehicle.

In another favorable embodiment, the apparatus has at least one portable part that is designed to determine data, via an interface, from a vehicle board network and/or determine data from a navigation map or an external database, and to carry out one or a plurality of further steps of the method to process data of a route profile for a vehicle and/or a favorable embodiment of the method to process data of a route profile for a vehicle.

The portable part of the apparatus can, for example, be situated in a smart phone, a tablet PC and/or a mobile navigation device.

Preferably, the apparatus has a sensor system and is designed to determine the first set of route profile data for the predetermined route section. This can be a specially set up sensor system of the vehicle or the portable part of the apparatus, that, more specifically is designed to determine a location-related and/or time-related profile of one or a plurality of parameters of one or a plurality of local road characteristics, more particularly with relation to movement, for example depending on a route section being driven on with the vehicle.

In accordance with another aspect, the invention is characterized by a computer program, whereby the computer program is designed to carry out the method to process data of a route profile for a vehicle or a favorable embodiment of the method to process data of a route profile for a vehicle on another data-processing apparatus.

In accordance with another aspect, the invention is characterized by a computer program product, which includes executable program code, whereby the program code carries out the method to process data of a route profile for a vehicle or a favorable embodiment of the method to process data of a route profile for a vehicle during its execution using a data-processing apparatus.

The computer program product in particular includes a medium that can be read by the data-processing apparatus and has the program code stored on it.

In accordance with another aspect, the invention is characterized by a program product that includes an authorized access right to the computer program product's stored data.

Within the scope of the invention, the vehicle is preferably a motor vehicle or a motorcycle. Thereby, this results in a plurality of advantages mentioned above and a plurality of other advantages that are comprehensible to people skilled in the art. The vehicle can also be a water vehicle, whereby a part of the seafloor and/or the water layers corresponding to the route can be used, for example for economic purposes. The vehicle can also be an aircraft or spacecraft, whereby the corresponding route is a part of the planet's surface, atmospheric layers or the planet's layers. Such applications, for example, for recording and transmitting of local physical characteristics of planets (with resolution up to the finest details) or other celestial bodies, are very favorable because the route profile data can be transmitted in an extremely compact form.

Exemplary embodiments of the invention shall be further explained in the following using the schematic drawings.

Other objects, advantages and novel features of the present invention will become apparent from the following detailed description of one or more preferred embodiments when considered in conjunction with the accompanying drawings.

BRIEF DESCRIPTION OF THE DRAWINGS

In the figures.

DETAILED DESCRIPTION OF THE DRAWINGS

Figure 1:
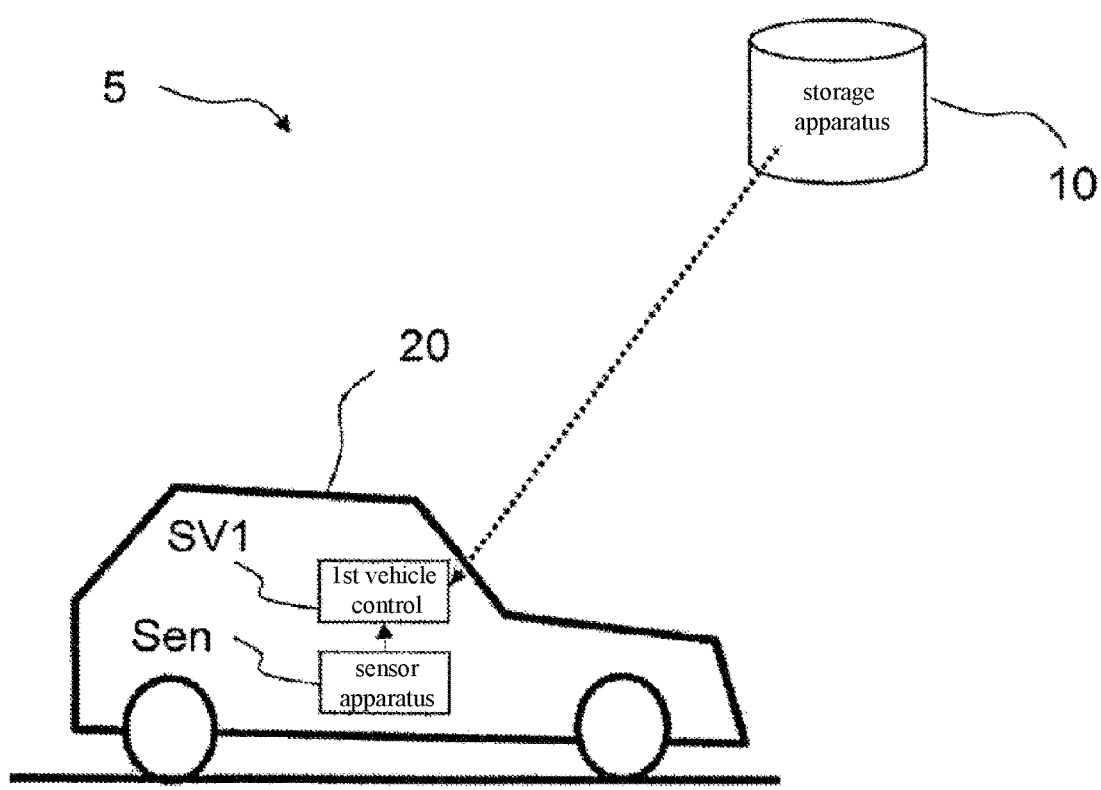
FIG. 1 shows a system to process data of a route profile for a vehicle.

FIG. 1 shows a system 5 to process data of a route profile for a vehicle.

The system 5 has a processing device that can also be identified as an apparatus to process data of a route profile for a vehicle. The processing device can, as is shown as an example in FIG. 1 be designed as a first vehicle control apparatus SV1 that is situated in a first vehicle 20. As an alternative, the processing device can include two or a plurality of distributed elements (for example, also a so-called distributed system) (not shown in FIG. 1). As an example, the processing device may include the first vehicle control apparatus SV1, which is situated in the first vehicle 20, and a second vehicle control apparatus, which is situated in a second vehicle 30, and/or an external control apparatus that is situated in a backend system.

Furthermore, the system 5 has a sensor apparatus Sen, which, as shown in FIG. 1, is situated in the first vehicle 20 as an example. The sensor apparatus Sen is designed to record data and provide it for the first vehicle control apparatus SV1 to determine the first set of route profile data that is representative of at least a first local physical road characteristic of the given route section. As an alternative, the sensor apparatus Sen can be situated in the second 30 or in another vehicle.

The system 5 furthermore has a storage apparatus 10 that is designed to provide and store a coded second set of route profile data. The storage apparatus 10 can include, as is shown in FIG. 1, a server in a backend system, for example. The storage apparatus 10 can, as an alternative, be situated in the first vehicle 20 or the second vehicle 30 and/or another vehicle. As an alternative, the storage apparatus 10 can be designed as a distributed system and, for example, include at least two elements of the following list: one or a plurality of mobile data carriers, a storage apparatus situated within the backend system, a storage apparatus that is situated in the second vehicle 30, or a storage apparatus that is situated in the first vehicle 20.

Figure 2:
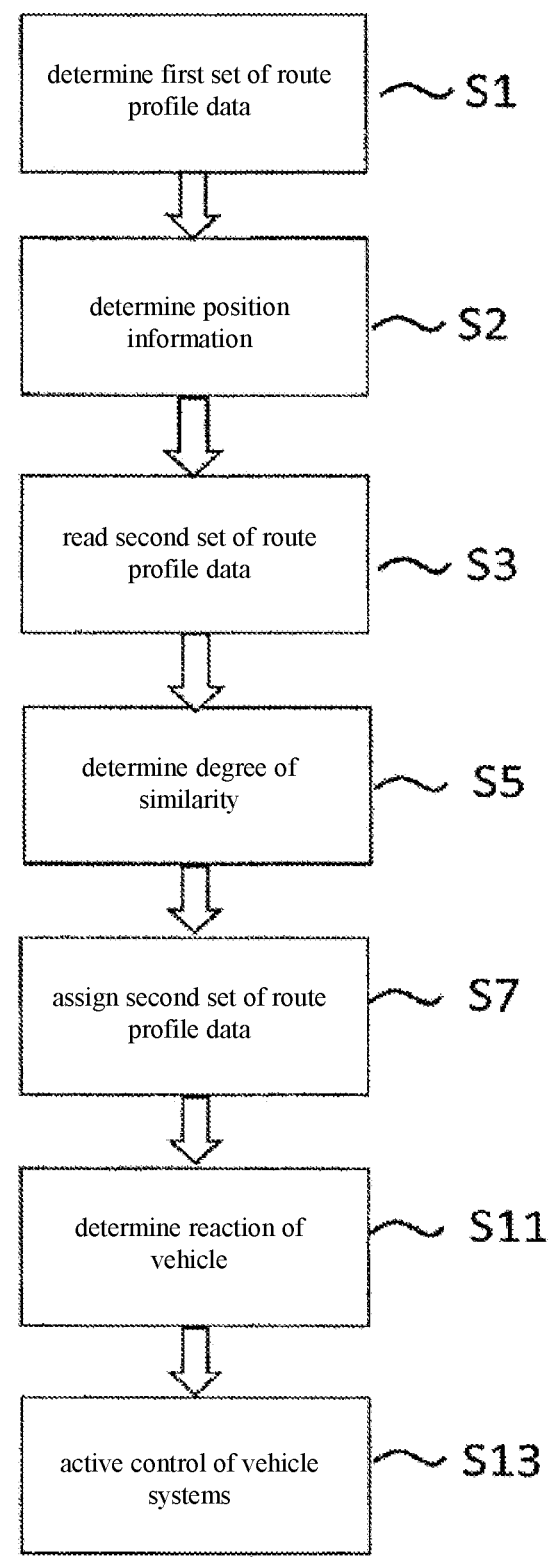
FIG. 2 shows a flowchart of a program to process data of a route profile for a vehicle.

FIG. 2 shows a flowchart of a program to process data of a route profile for the first vehicle 20. The program can, for example, be run using the first vehicle control apparatus SV1, that in particular has at least one processing device, a program and data storage system as well as, for example, one or a plurality of communication interfaces and that is situated in the first vehicle 20. The program and data storage system and the processing device of the first vehicle control apparatus SV1 can be designed in an assembly unit and/or be distributed across a plurality of assembly units.

After starting the program, the program is continued in a step S1 after, for example, variables have been initialized.

During the course of this step S1, the data provided by a given sensor apparatus are read and, depending on the data provided, the first set of route profile data is determined. The first set of route profile data is, for example, collected by means of the sensor apparatus Sen of the first vehicle 20. The first set of route profile data is representative of at least one first local physical road characteristic of a given route section.

In a step S3, the second set of route profile data provided is read, which is, at least in part, related to the predetermined route section, for which the first set of route profile data was determined, whereby the second set of route profile data is representative of at least a second local physical road characteristic.

The second set of route profile data is provided for example, by the server located within the backend system.

The second set of route profile data is preferably provided in the coded manner, whereby the coded route profile data include a spectral distribution and/or spectral distribution function determined depending on the second set of route profile data.

In this case, for example, depending on the first set of route profile data, decoding information is determined for the coded second set of route profile data and, depending on the decoding information, the coded second set of route profile data is, at least in part, decoded and made available.

The first local physical road characteristics and the second local physical road characteristics may refer, at least in part, to different physical road characteristics or measured parameters. The first local physical road characteristics can for example be assigned, at least in part, to one first class and the second local physical road characteristics can be assigned, at least in part, to one second class, whereby the first class and the second class are different in such a way that one of the classes includes local physical road characteristics that are assigned directly to the road and the other class includes local physical road characteristics that are determined depending on a specific characteristic of the vehicle and/or another vehicle.

The first local physical road characteristic and/or the at least one second local physical road characteristic can represent a profile of a local road height and/or road curvature and/or a profile of transverse forces that have an effect on the vehicle or another vehicle when driving on the route section and/or a profile of a friction coefficient and/or a profile of a local temperature of the road and/or a profile of at least one mechanical force that has an impact on a component of a vehicle chassis.

The first set of route profile data and/or the second set of route profile data may, for example, respectively represent a distribution function or profile function of the route moisture and/or a distribution function or profile function of the route temperature and/or a distribution function or profile function of the friction coefficient.

In a step S5, a degree of similarity between one or a plurality of profiles of at least one physical characteristic and/or spectral distribution function of at least once physical characteristic represented in the first set of route profile data and the second set of route profile data is determined.

For this purpose, a data segment of the coded second set of route profile data, for example, is decoded and the degree of similarity and/or a cross-correlation function between the first set of route profile data and the decoded second set of route profile data of the data segment is determined.

Alternatively, a spectral distribution or a spectral distribution function concerning the first set of route profile data can be determined. This can take place as a coding of a data segment of the first set of route profile data (in a coding format that is suitable for coding the second set of route profile data). The degree of similarity or the cross-correlation function can then be determined between the coded first set of route profile data and the coded second set of route profile data.

Determining one or a plurality of degrees of similarity can take place, for example, outside of the vehicle, for example, in a backend system.

In a step S7, depending on the degree of similarity, an assignment of the second set of route profile data is determined and/or to a time-dependent mapping function of the influences of the route on the vehicle.

In an optional step S2, which is carried out before step S3, positioning information is determined that is representative of a predetermined route section. The second set of route profile data is then made available depending on the positioning information determined.

In an optional step S11, a vehicle profile of the first vehicle is, for example, made available and, depending on the vehicle profile and the second set of route profile data, at least one reaction of the first vehicle when driving on a given local route section is determined.

In an optional step S13, depending on the determined assignment of the second set of route profile data, at least one active control of vertical dynamic attenuation and/or an acceleration effect on a passenger compartment of the vehicle and/or a change of a function that controls a torque having impact on the steering wheel of the vehicle depending on the force effect of the local physical characteristic of the route on at least one wheel of the vehicle and/or a change of at least one vehicle function for the semi-automated longitudinal and/or transverse control of the vehicle is carried out.

Figure 3:
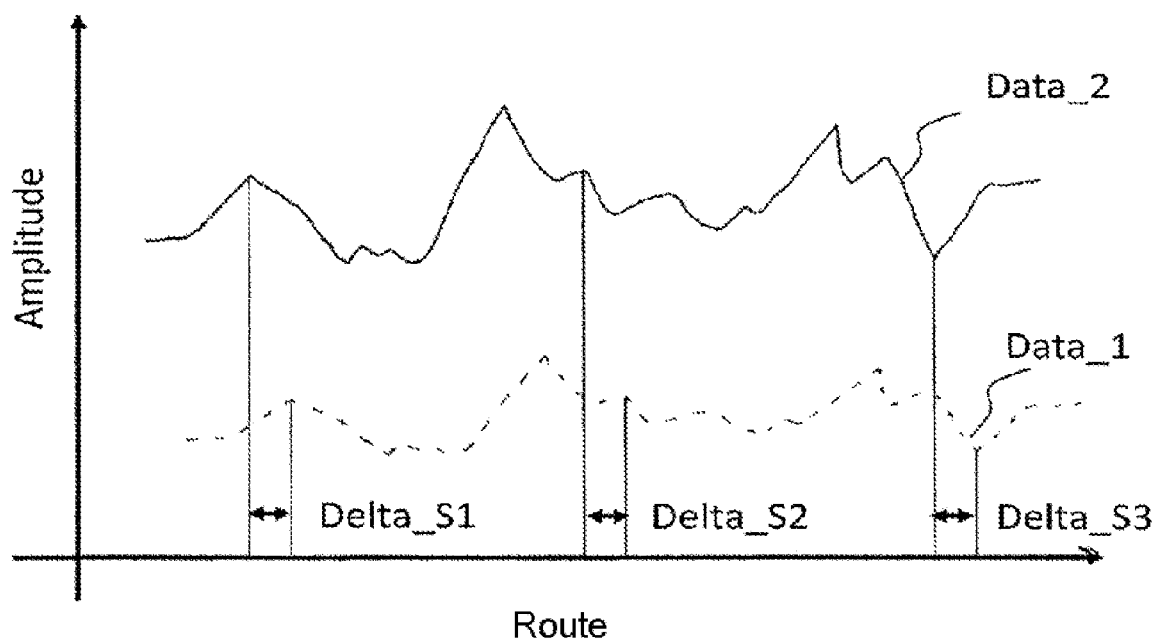
FIG. 3 shows an exemplary profile of a first set of route profile data and a second set of route profile data and
FIG. 4 shows another exemplary profile from a first set of route profile data and a second set of route profile data.

FIG. 3 shows an exemplary first profile Data_1 of the first set of route profile data. In the shown example, the first set of route profile data is available in "bad quality", for example, in a time-discreet manner and or roughly quantized and/or with a limited amplitude and/or frequency range. FIG. 3 furthermore shows an exemplary second profile Data_2 of the second set of route profile data that is available in a good level or a considerably high level of quality.

The profiles Data_1, Data_2 of the first and second sets of route profile data have a spatial offset to Delta_S1, Delta_S2, Delta_S3 in the example shown in FIG. 3. The spatial offset Delta S1, Delta S2, Delta S3 is preferably taken into consideration in the case of a real-time-capable use of the first and/or second set of route profile data in the vehicle. In this way, for example, for each wheel, a function is determined that represents a time function of a force effect on the respective wheel.

FIG. 3 shows the principle of minimizing a resulting total variance that can be very much smaller than the individual deviations of the individual offset values as well as of the other data determined.

Figure 4:
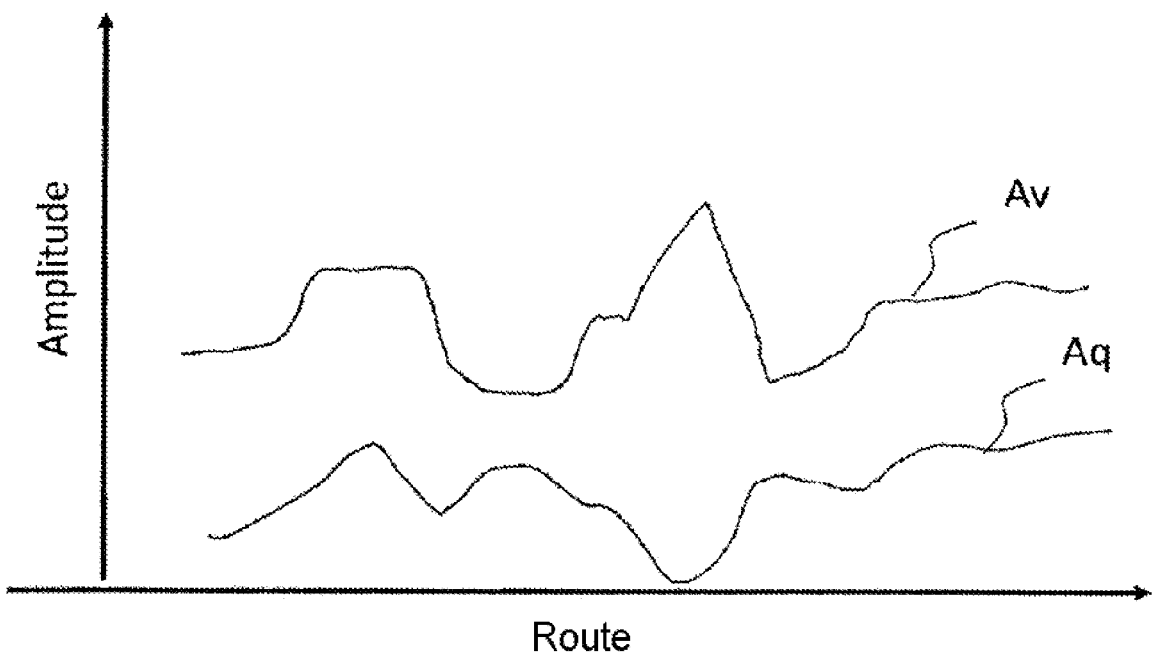

FIG. 4 shows a respective exemplary profile of the first and second set of route profile data, for example, a profile of vertical forces Av and a profile of transverse forces Aq.

Here, the first set of route profile data represent, for example, the profile of vertical forces Av with reference to relative location information (can also be relative time information) that have an effect on a wheel of the vehicle in a vertical direction. These can be captured in the vehicle very easily.

The second set of route profile data represent, for example, the location-related profile of the transverse forces Aq that have an effect on a wheel of the vehicle in a transverse direction. These cannot be so easily captured in the vehicle.

By means of an optional additional aggregation of the first and second set of data, for example, a location-related or time-related function is determined that will affect the influence of a plurality of forces on a wheel of the vehicle at a certain time, for example less than in the next 0.1, 0.3, 0.5, 1 second.

Preferably, depending on the determined function, a selective transmission of and/or compensation for the forces/accelerations on the passenger compartment of the vehicle can be set or varied. Thereby, certain forces, vibrations in particular, can be attenuated with particular selectivity depending on frequencies or other parameters and/or left alone and/or specifically increased.

REFERENCE LIST 5 system
10 storage apparatus
20 first vehicle
30 second vehicle
Aq Profile of the transverse forces
Av Profile of the vertical forces
Data_1 first profile of the first set of route profile data
Data_2 second profile of the second set of route profile data
Delta_S1, spatial offset
Delta_S2,
Delta_S3
Sen sensor apparatus
SV1 first vehicle control apparatus
S1, . . . , S13 program steps The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for processing route profile data for a vehicle, comprising:
    acquiring, by the vehicle, a first set of the route profile data for a predetermined route section of a route of the vehicle, the first set of route profiled data depending on data provided by a sensor of the vehicle, the first set of the route profile data being representative of at least a first local physical road characteristic of the predetermined route section at geo-spatial positions according to a first geo-spatial resolution;
    reading, by the vehicle, a second set of the route profile data, the second set of the route profile data being at least partly related to the predetermined route section, the second set of the route profile data being representative of at least a second local physical road characteristic at geo-spatial positions according to a second geo-spatial resolution more precise than the first geo-spatial resolution of the first set of route profile data;
    determining, by the vehicle, a degree of similarity between the first set of the route profile data and the second set of the route profile data; and
    assigning, based on the determined degree of similarity, the second set of the route profile data to at least one of: conditions immediately surrounding the vehicle, and a time-dependent mapping function of influences that the route has on the vehicle, within at least one vehicle function control system of the vehicle.

2. The method as claimed in claim 1, further comprising:
    determining positioning information that is representative of a given route section, wherein the second set of the route profile data depends on the determined positioning information.

3. The method as claimed in claim 1, wherein the first local physical road characteristics and the second local physical road characteristics refer, at least in part, to different physical road characteristics or measured parameters.

4. The method as claimed in claim 3, further comprising:
    assigning the first local physical road characteristics, at least in part, to one first class; and
    assigning the second local physical road characteristics, at least in part, to one second class,
    wherein the first and second classes are different such that one of the first and second classes includes local physical road characteristics that can be assigned directly to the road, and the other of the first and second classes includes local physical road characteristics that are determined depending on a specific characteristic of the vehicle and/or another vehicle.

5. The method as claimed in claim 1, wherein the at least one first local physical road characteristic and/or the at least one second local physical road characteristic represents at least one of:
    a profile of a local road height and/or road curvature,
    a profile of transverse forces that have an effect on the vehicle or another vehicle when driving on the route section,
    a profile of a friction coefficient,
    a profile of a local temperature of the road, and a profile of at least one mechanical force and/or a physical effect that has an impact on a component of a chassis of the vehicle.

6. The method as claimed in claim 1, wherein the first set of the route profile data and the second set of the route profile data refer, at least in part, to different running directions within a given route section.

7. The method as claimed in claim 1, wherein the first set of the route profile data and/or the second set of the route profile data are determined by or are dependent on a course of a route relief detected by the vehicle or another vehicle.

8. The method as claimed in claim 1,
wherein the first set of the route profile data refers to the first local physical road characteristics of a first route section, and
wherein said assigning the second set of the route profile data is performed for a second route section, and
wherein the first route section and the second route section are different.

9. The method as claimed in claim 1, wherein the first set of route profile data is based on a profile of vertical and/or transverse forces having an impact on the vehicle.

10. The method as claimed in claim 1, further comprising providing the second set of the route profile data from a second vehicle that is at least one of located in a predetermined environment of the vehicle and drives in a predetermined direction toward the vehicle.

11. The method as claimed in claim 1, further comprising:
providing a vehicle profile of the vehicle; and
determining, depending on the vehicle profile and the second set of the route profile data, information that is representative of at least one degree of an impact of local physical road characteristics on the vehicle when driving on a given local route section.

12. The method as claimed in claim 1, wherein at least one of the first set of the route profile data and the second set of the route profile data respectively represents a varying local physical road characteristic of a route section.

13. The method as claimed in claim 12, wherein at least one of the first set of route profile data and the second set of route profile data respectively represents at least one of:
a distribution function or profile function of the route moisture,
a distribution function or profile function of the route temperature, and
a distribution function or a profile function of the friction coefficient.

14. The method as claimed in claim 1, wherein the second set of the route profile data comprises a coded second set of the route profile data, wherein the coded second set of the route profile data includes at least one of: (a) a spectral distribution, and (b) a spectral distribution function.

15. The method as claimed in claim 14, further comprising:
determining, based on the first set of the route profile data, decoding information for the coded second set of route profile data; and
decoding, at least partly and using the decoding information, the coded second set of route profile data.

16. The method as claimed in claim 1, in which, at least one of the following is performed in the vehicle based on said assigning of the second set of route profile data:
active control of vertical dynamic attenuation and/or acceleration effect on a passenger compartment of the vehicle,
change of a function that controls a torque having impact on a steering wheel of the vehicle depending on a force effect of local physical characteristics of the route on at least one wheel of the vehicle, and
change of at least one vehicle function for a semi-automated longitudinal and/or transverse control of the vehicle.

17. An apparatus to process route profile data for a vehicle, wherein the apparatus is configured to:
determine, by the apparatus of the vehicle, a first set of the route profile data for a predetermined route section of a route of the vehicle, the first set of route profiled data being based on data provided by a sensor apparatus of the vehicle, the first set of the route profile data being representative of at least a first local physical road characteristic of the predetermined route section at geo-spatial positions according to a first geo-spatial resolution,
read, by the apparatus of the vehicle, a second set of the route profile data, the second set of the route profile data being at least partly related to the predetermined first route section, the second set of the route profile data being representative of at least a second local physical road characteristic at geo-spatial positions according to a second geo-spatial resolution more precise than the first geo-spatial resolution of the first set of route profile data,
determine, by the apparatus of the vehicle, a degree of similarity between the first set of the route profile data and the second set of the route profile data,
assign, based on the determined degree of similarity, the second set of the route profile data to at least one of: conditions immediately surrounding the vehicle, and a time-dependent mapping function of influences that the route has on the vehicle, within at least one vehicle function control system of the vehicle.

18. The apparatus as claimed in claim 17, wherein the apparatus comprises the sensor apparatus and is further configured to determine the first set of the route profile data for the predetermined route section.

19. The apparatus as claimed in claim 17, wherein the apparatus has at least one portable part that is configured to at least one of (i) determine data, via an interface, from a vehicle board network and (ii) determine data from at least one of a navigation map and an external database.

20. A computer program product comprising computer-readable code that is stored on non-transitory computer readable medium, wherein when executed by a data processing apparatus of a vehicle, the computer-readable code is to:
determine, by the data processing apparatus of the vehicle, a first set of the route profile data for a predetermined route section of a route of the vehicle, the first set of route profiled data being based on data provided by a sensor apparatus of the vehicle, the first set of the route profile data being representative of at least a first local physical road characteristic of the predetermined route section at geo-spatial positions according to a first geo-spatial resolution,
read, by the data processing apparatus of the vehicle, a second set of the route profile data, the second set of the route profile data being at least partly related to the predetermined first route section, the second set of the route profile data is being representative of at least a second local physical road characteristic at geo-spatial positions according to a second geo-spatial resolution more precise than the first geo-spatial resolution of the first set of route profile data, determine, by the data processing apparatus of the vehicle, a degree of similarity between the first set of the route profile data and the second set of the route profile data, assign, based on the determined degree of similarity, the second set of the route profile data to at least one of: conditions immediately surrounding the vehicle, and a time-dependent mapping function of influences that the route has on the vehicle, within at least one vehicle function control system of the vehicle.

* * * * *